Dec. 7, 1954   M. D. BENNETT   2,696,109
SPRING BALANCE
Filed April 4, 1952
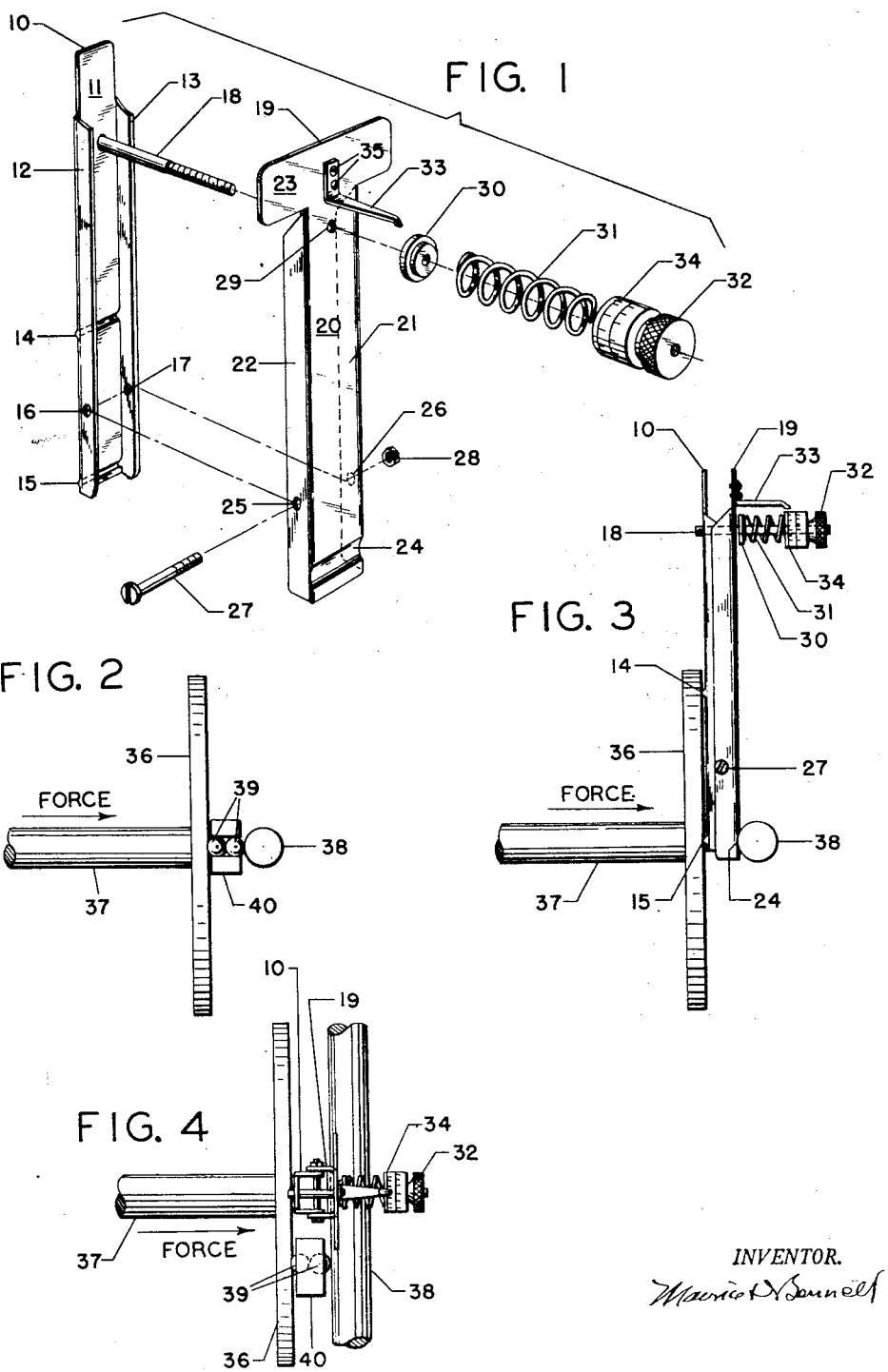
INVENTOR.
Maurice D. Bennett United States Patent Office 2,696,109
Patented Dec. 7, 1954

2,696,109

SPRING BALANCE

Maurice D. Bennett, Glenbrook, Conn., assignor to The Reflectone Corporation, a corporation of Connecticut Application April 4, 1952, Serial No. 280,511

2 Claims. (Cl. 73—141)

The present invention relates to a spring balance and particularly to a spring balance for measuring thrust force.

When measuring thrust force within a mechanical assembly and under conditions of confined space, it has been a common practice to employ the combination of a lever which reaches into the assembly and a spring scale attached to the open or accessible end of the lever thereby establishing a moment of force which is directed to oppose the thrust to be measured. In order to obtain accurate measurement it is necessary that the lever be positioned in a plane normal to the direction of the force of the thrust. Furthermore the spring scale must be applied to the free end of the lever in such a way that the axis of the force created by the spring scale is in a plane parallel to the direction of the thrust.

When pulling on the spring scale for establishing the moment opposing the thrust force, the lever must pivot about a fulcrum and depending upon the skill of the operator the direction of the force created by the spring scale may or may not be retained normal to the lever. Still further, when a large mechanical displacement per unit of thrust force is provided, the lever will have to pivot about the fulcrum to such an extent that the combination of the lever and spring force can neither be retained in its normal alignment with respect to one another nor in proper alignment with the direction of the thrust.

One of the principal objects of this invention is to provide a simplified spring balance for measuring thrust force.

Another important object of this invention is the provision of a spring balance in which the lever and the direction of the counterthrust means are retained normal to one another independent of the skill and care of the operator.

Another object of this invention is the provision of a spring balance for measuring thrust which minimizes measuring errors due to misalignment of mechanical moments.

The invention includes a plurality of substantially parallel beams pivotally mounted with respect to one another and positionable in a plane substantially normal to the direction of the thrust force. Resilient means attached to one end of said beams are adapted to cause rotation of said beams in a plane substantially parallel to the thrust force.

For a better understanding of the present invention together with other and further objects thereof reference is made to the following description taken in connection with the drawings in which:

Figure 1 is an exploded view of the spring balance;
Figure 2 is a schematic vertical cross-section of a mechanical disk-ball-roller integrator, one of the devices for which the spring balance is applicable;
Figure 3 is a schematic vertical cross-section showing the spring balance positioned in the integrator for measuring thrust force;
Figure 4 is a schematic top view of Figure 3.

Referring to Figure 1, reference numeral 10 identifies a U-channel beam having a base 11 and two integral flanges 12 and 13 respectively. Two ridge-like protrusions 14 and 15 respectively, traverse the lower end of the base 11, the purpose of which will be explained later. An aperture 16 located on the flange 12 and positioned intermediate the protrusions 14 and 15 is aligned with an aperture 17 in the opposite flange 13. A screw 18 fastened near the upper end of base 11 extends outwardly in a plane substantially normal to the longitudinal axis of beam 10.

In a similar manner, a U-channel beam 19 comprises a base 20 and integral flanges 21 and 22 respectively. For convenience sake, beam 19 at its upper end terminates in a grip 23. A groove-like depression 24 traverses the base 20 of beam 19 near its lower end, the purpose thereof will be shown later. Two apertures 25 and 26 are located in the flanges 22 and 21 respectively and are aligned with one another.

As beam 19 with base 20 is slightly wider than beam 10, both beams may be brought together in such a manner that flanges 21 and 22 of beam 19 overlap flanges 13 and 12 of beam 10. A screw 27 with nut 28 may be pushed through the aligning flange apertures 25, 16, 17 and 26 and serves as a pivot for rotating both beams with respect to one another. Screw 18 extending from base 11 fits through a corresponding aperture 29 of beam 19 and receives a washer 30, helical compression spring 31 and an internally threaded and recessed adjusting knob 32.

When tightening adjusting knob 32 on screw 18, spring 31 compresses and causes beams 10 and 19 to rotate about pivot 27 in such a manner as to effect a converging movement of the upper ends of beams 10 and 19 and a diverging movement of the lower ends. The amount of compression of spring 31 is rendered visible by means of the combination of pointer 33 attached with screws 35 to the grip 23 of beam 19, and dial graduation 34 on adjusting knob 32.

Figure 2 is a schematic cross-section of a typical mechanical integrator comprising a rotating disk 36 attached to shaft 37 and resiliently mounted along the axis of rotation. The rotation of disk 36 is transmitted to fixed center mounted roller 38 by means of a set of balls 39 confined in cage 40. In order that there is proper power transmission between disk 36 and roller 38 axial thrust force is applied to the disk in the direction indicated by the arrow.

In Figures 3 and 4 the spring balance is shown positioned in the mechanical integrator as may be useful for the purpose of measuring the thrust force exerted by disk 36 against roller 38. The ridge-like transverse protrusions 14 and 15 of beam 10 contact disk 36 and cause beam 10 to be in parallel alignment with the face of the disk and to be normal to the direction of the thrust force. Depression 24 of beam 19 is shaped to receive roller 38. The transverse distance between protrusions 14 and 15 and depression 38 is such that the longitudinal axis of the beams is in parallel alignment with the face of disk 36 when the spring balance is inserted. The axis of spring 31 by means of screw 18 and washer 30 is positioned normal to the base 20 of beam 19 and aligned parallel with the direction of the thrust force effective upon disk 36.

In order to insert the spring balance, the adjusting knob 32 is set to its lowest spring pressure. Then, by squeezing grip 23 of beam 19 toward knob 32, the lower ends of beam 10 and 19 converge toward one another by rotation about pivot 27, thereby permitting insertion of the spring balance in the integrator. As a next step, adjusting knob 32 is tightened on bolt 18 thereby compressing spring 31. The increasing spring pressure becomes effective as a counterthrust exerted between fixed center mounted roller 38 and resiliently mounted disk 36 and by probing with a thin feeler gage (.001 inch) between balls 39 and either disk 36 or roller 38, it is possible to determine very accurately the pressure necessary to lift off the disk from the balls. This pressure as a function of compression of spring 31 and mechanical moment about pivot 27 may be read on the calibrated scale 34 of knob 32. It will be observed that beam 10 at all times is retained in a plane normal to the direction of the thrust upon disk 36, and that the direction of the force created by spring 31 will remain substantially normal to beam 10 and substantially parallel to the direction of the thrust force acting upon disk 36. In order to establish the counterthrust necessary to lift off the balls from the disk, beam 19 rotates about pivot 27 a very limited amount. When using a thin feeler gage (.001 inch) between the balls and either disk or roller, the amount of rotation necessary by beam 19 is so small that this beam may be considered to remain in substantial parallelism with beam 10. Consequently, there will be the very least amount of errors due to misalignment of mechanical moments.

While there has been described and illustrated a specific embodiment of the invention, it will be obvious to those skilled in the art that various changes and modifications may be made therein without departing from the field of the invention which should be limited only by the scope of the appended claims.

What is claimed is:

1. A spring balance for measuring thrust force comprising a pair of spaced apart U-channel shaped parallel beams disposed to have opposing base portions and overlapping flange portions; a pin located intermediate the ends of said beams extending through the flange portions of said beams permitting pivotal movement of said beams with respect to one another; the first beam of said pair having near one of its ends a stud-like threaded supporting member extending therefrom, the longitudinal axis thereof being normal to the base of said beam; the second beam having in its base portion near one of its ends an aperture for receiving said stud-like supporting member therethrough; a helical spring having one of its ends positioned on the base of the second beam opposite to the first beam encircling a portion of the threaded supporting member; an internally threaded adjusting member supporting the other end of said spring and engaging also the supporting member for rotational and axial movement relative thereto thereby causing adjustable force to be exerted by said spring; calibration markings on the periphery of said adjusting member; a fixed pointer extending from said second beam for cooperation with said calibration markings to indicate the movement of said adjusting member relative to said supporting member thereby determining the amount of force exerted by said spring.

2. A spring balance for measuring thrust force comprising a pair of spaced apart U-channel shaped parallel beams disposed to have opposing base portions and overlapping flange portions; a pin located intermediate the ends of said beams extending through the flange portions of said beams permitting pivotal movement of said beams with respect to one another; the first beam of said pair having near one of its ends a stud-like threaded supporting member extending therefrom, the longitudinal axis thereof being normal to the base of said beam; the second beam having in its base portion near one of its ends an aperture for receiving said stud-like supporting member therethrough; a helical spring having one of its ends positioned on the base of the second beam opposite to the first beam encircling a portion of the threaded supporting member; an internally threaded adjusting member supporting the other end of said spring and engaging also the supporting member for rotational and axial movement relative thereto thereby causing adjustable force to be exerted by said spring; calibration markings on the periphery of said adjusting member; a fixed pointer extending from said second beam for cooperation with said calibration markings to indicate the movement of said adjusting member relative to said supporting member thereby determining the amount of force exerted by said spring; and one of the beams having near the other end a transverse depression in its base portion adapted to engage a roller.

References Cited in the file of this patent

UNITED STATES PATENTS

| Number | Name | Date |
|---|---|---|
| 485,216 | Page | Nov. 1, 1892 |
| 1,186,174 | Eloesser | June 6, 1916 |
| 1,557,341 | Scalbom | Oct. 13, 1925 |
| 2,494,571 | Milburn | Jan. 17, 1950 |
| 2,616,292 | Malm | Nov. 4, 1952 |